United States Patent
Blum

(10) Patent No.: US 9,466,019 B2
(45) Date of Patent: Oct. 11, 2016

(54) TRANSACTION CARDS AND ASSOCIATED METHODS

(71) Applicant: Black Card LLC, Jackson, WY (US)

(72) Inventor: Scott Alan Blum, Jackson, WY (US)

(73) Assignee: Black Card LLC, Jackson, WY (US)

( * ) Notice: Subject to any disclaimer, the term of this patent is extended or adjusted under 35 U.S.C. 154(b) by 0 days.

(21) Appl. No.: 14/569,087

(22) Filed: Dec. 12, 2014

(65) Prior Publication Data

US 2015/0178616 A1    Jun. 25, 2015

Related U.S. Application Data

(60) Provisional application No. 61/918,075, filed on Dec. 19, 2013.

(51) Int. Cl.
*G06K 19/077* (2006.01)

(52) U.S. Cl.
CPC ... *G06K 19/07749* (2013.01); *G06K 19/07722* (2013.01); *Y10T 29/49826* (2015.01)

(58) Field of Classification Search
CPC .. G06K 19/083; G06K 19/022; G06K 19/02; G06K 19/07749; G06K 19/07722; Y10T 29/49826

See application file for complete search history.

(56) References Cited

U.S. PATENT DOCUMENTS

| | | | | |
|---|---|---|---|---|
| 5,578,415 | A * | 11/1996 | Hayashi et al. | 430/270.11 |
| 5,609,967 | A * | 3/1997 | Matsunami | B41M 1/12 428/601 |
| 8,672,232 | B2 * | 3/2014 | Herslow | 235/492 |
| 2004/0217178 | A1 * | 11/2004 | Lasch et al. | 235/488 |
| 2009/0032593 | A1 * | 2/2009 | Ljungcrantz | 235/441 |
| 2009/0078776 | A1 * | 3/2009 | Blum | 235/487 |
| 2011/0108629 | A1 | 5/2011 | Mueller-Hipper et al. | |
| 2012/0111949 | A1 | 5/2012 | Klaas et al. | |
| 2013/0320095 | A1 | 12/2013 | Blum | |

FOREIGN PATENT DOCUMENTS

WO    WO2015/094978    6/2015

OTHER PUBLICATIONS

International Search Report dated Apr. 1, 2015 from International Bureau for related PCT Application No. PCT/US2014/070093.
Written Opinion dated Apr. 1, 2015 from International Bureau for related PCT Application No. PCT/US2014/070093.
International Preliminary Report on Patentability dated Jun. 21, 2016 from International Bureau for related PCT Application No. PCT/US2014/070093.

* cited by examiner

*Primary Examiner* — Sonji Johnson
(74) *Attorney, Agent, or Firm* — Klein, O'Neill & Singh, LLP

(57) ABSTRACT

A transaction card having a first layer and a second layer, wherein the first layer is metal and the second layer is a polymer, polycarbonate, or carbon. The metal layer may be stainless steel plated with gold.

11 Claims, 4 Drawing Sheets

TRANSACTION CARDS AND ASSOCIATED METHODS

CROSS-REFERENCE TO RELATED APPLICATION

This application claims priority to U.S. provisional application Ser. No. 61/918,075, filed on Dec. 19, 2013, the entire contents of which are hereby incorporated by reference.

BACKGROUND

The present disclosure relates to transaction cards, such as credit cards and debit cards, that are used as substitutes for cash.

DESCRIPTION OF RELATED ART

The vast majority of transaction cards in use today are constructed of plastic. These cards tend to be flimsy and wear out or break easily. Continuous efforts are being made to produce better transaction cards.

SUMMARY

The various aspects of the present transaction card have several features, no single one of which is solely responsible for their desirable attributes. Without limiting the scope of the present aspects as expressed by the claims that follow, their more prominent features will now be discussed briefly. After considering this discussion, and particularly after reading the section entitled "Detailed Description," one will understand how the features of the present aspects provide advantages, which include increased strength and durability, greater rigidity, decreased weight, longer lifespan, enhanced feel, and high tech look.

In a first aspect, which is generally applicable (i.e. independently combinable with any of the aspects or aspects identified herein), particularly with any other aspect of the first aspect, certain of the present aspects comprise a transaction card which is a substantially planar sheet having a front surface, a back surface and a continuous peripheral edge. The planar sheet includes a first layer and a second layer. The first layer is metal and the second layer is at least one of a polymer, polycarbonate, or carbon.

In an aspect of the first aspect, the metal layer is stainless steel plated with gold.

BRIEF DESCRIPTION OF THE DRAWINGS

The various aspects of the present transaction card will now be discussed in detail with an emphasis on highlighting the advantageous features. These aspects depict the novel and non-obvious transaction card shown in the accompanying drawings, which are for illustrative purposes only. These drawings include the following figures, in which like numerals indicate like parts.

DETAILED DESCRIPTION

Figure 1:
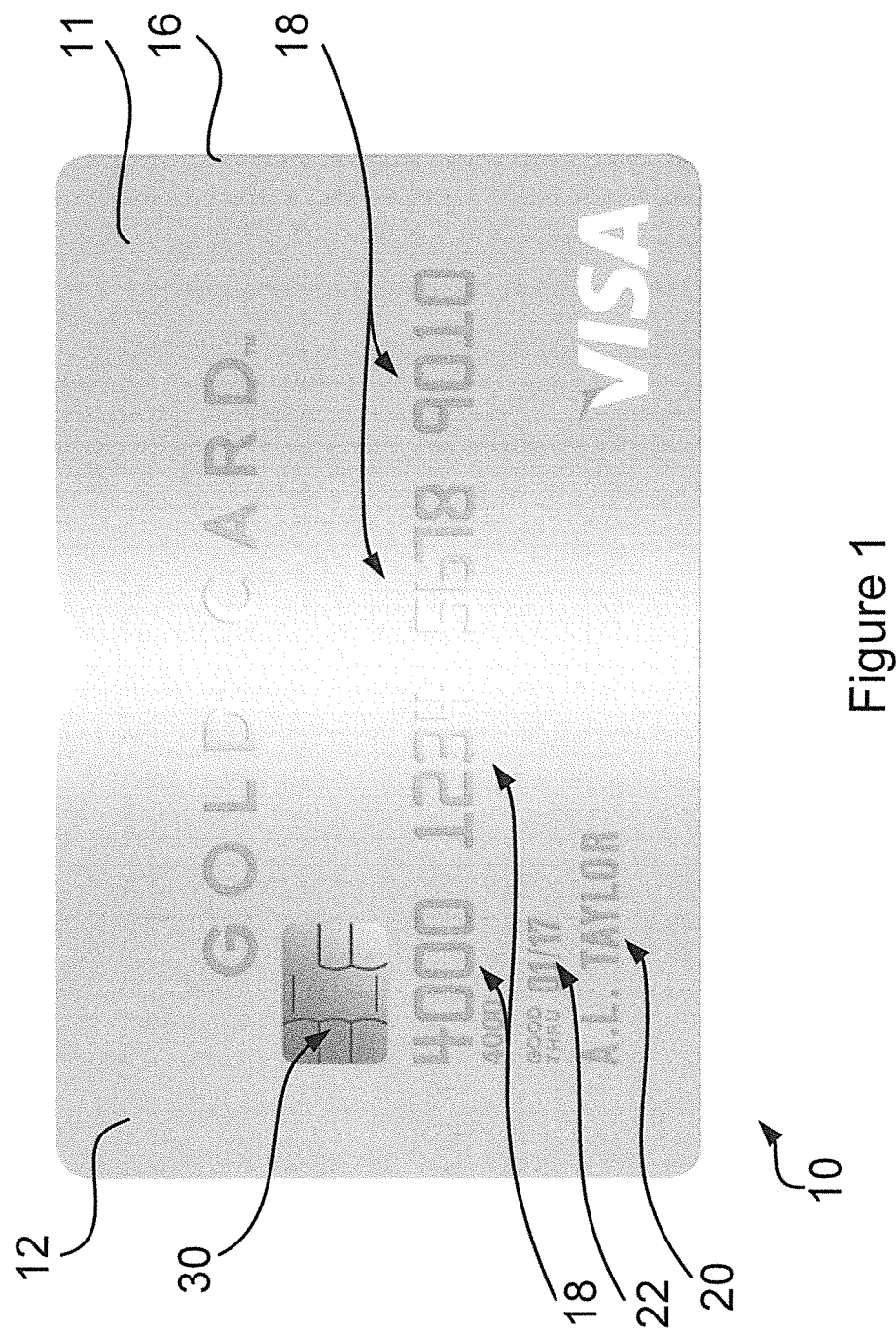
FIG. 1 is a front planar view of one aspect of the present transaction cards.
Figure 2:
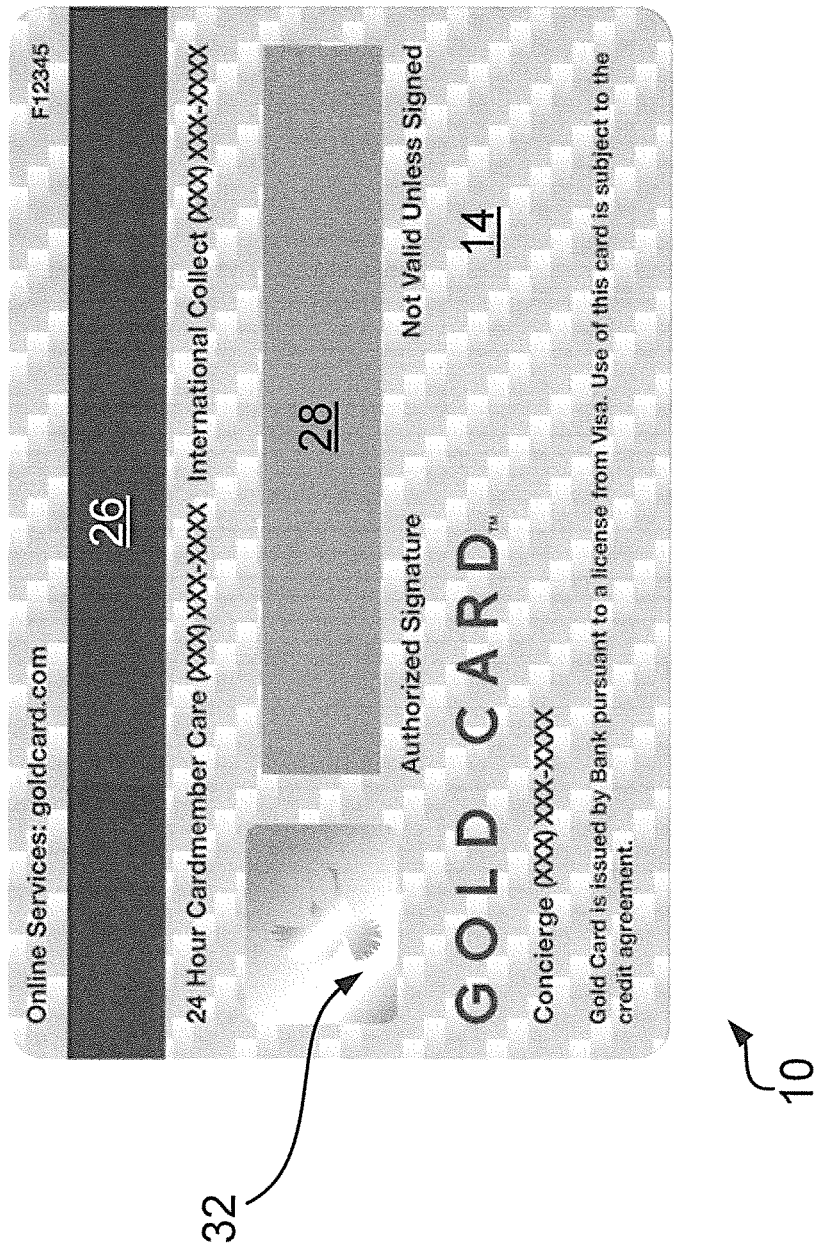
FIG. 2 is a rear planar view of the transaction card of FIG. 1.

With reference to FIGS. 1 and 2, the present transaction card 10 is a substantially planar sheet 11 having a front surface 12 and a back surface 14. The card 10 includes a continuous peripheral edge 16, which in the illustrated aspect is substantially rectangular. However, those of ordinary skill in the art will appreciate that the card 10 could have virtually any shape, such as square, round, or hexagonal. The scope of the present card 10 is not limited to any particular shape.

In the illustrated aspect, the transaction card 10 bears a number 18 (FIG. 1) that identifies the card 10 as being associated with a particular account. In the illustrated aspect, the account number 18 has sixteen digits. However, in alternative aspects the card 10 may have fewer or more digits. The card 10 also bears the name 20 of the cardholder and an expiration date 22. In certain aspects, the card 10 may also bear a year or date on which the cardholder first acquired the card 10. The information displayed on the card 10 may be applied in any suitable manner, such as embossing, printing, engraving, etching, etc.

With reference to FIG. 2, the back surface 14 of the present transaction card 10 includes a magnetic strip 26. The magnetic strip 26 stores information that is readable by a magnetic reader. For example, information encoded on the magnetic strip 26 may include a series of digits from which the magnetic card reader can obtain information about the account associated with the card 10 and/or the cardholder. The back surface 14 of the present transaction card 10 further includes a signature panel 28.

The present transaction card 10 further includes an embedded chip 30 (FIG. 1), such as a radio-frequency identification (RFID) chip or an EMV (Europay, MasterCard, and VISA) chip 30. RFID is a wireless non-contact system that uses radio-frequency electromagnetic fields to transfer data from the chip 30 to a receiver for the purposes of automatic identification and tracking. EMV is a global standard for inter-operation of integrated circuit cards (IC cards or "chipcards") and IC card capable point of sale (POS) terminals and automated teller machines (ATMs), for authenticating credit and debit card transactions. The card 10 may further include a holographic image 32 (FIG. 2) or other security element, which is useful to discourage counterfeiting. While not shown, the card 10 may further include one or more transparent portions. Such transparent portions may include one or more optically recognizable layers or infrared-blocking ink to allow the transparent portion(s) to be recognized by an optical card reader. These additional features may allow the transaction card 10 to function more easily, efficiently, and/or more securely.

Figure 3:
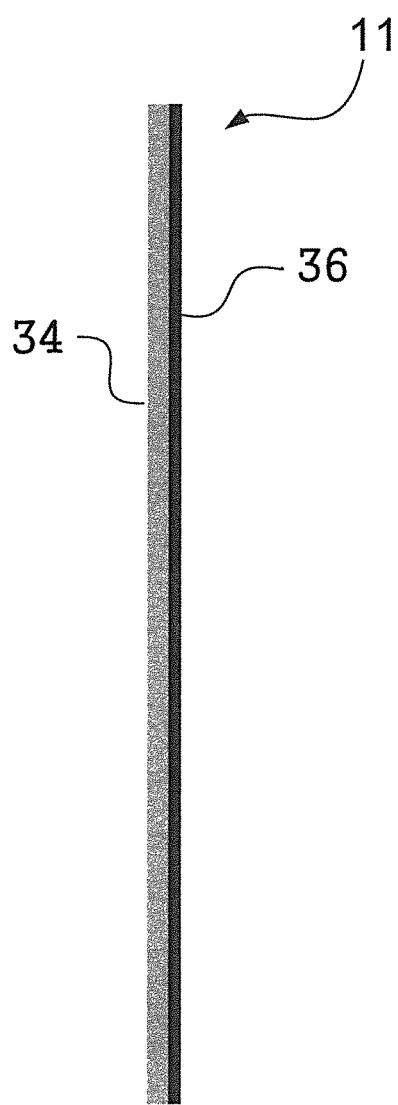
FIG. 3 is a side planar view of the transaction card of FIG. 1.

With reference to FIG. 3, the planar sheet 11 is constructed of a front layer 34 and a back layer 36. In the illustrated aspect, the front layer 34 is a metal and the back layer 36 is at least one of a polymer, polycarbonate, or carbon. A non-exhaustive and non-limiting list of example metals and metal alloys for the front layer 34 includes scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, aluminum, gallium, indium, thallium, lead, bismuth, tin, stainless steel, bronze, brass, nickel-silver, and any combination(s) of the foregoing. A non-exhaustive and non-limiting list of example polymers for the back layer 36 includes polyethylene, polyethylene terephthalate, polypropylene, polystyrene, polytetrafluoroethylene, polyvinylchloride (PVC), polychlorotrifluoroethylene, polyacrylonitrile, polychloroprene, polyurethane, polyamide (nylon), and polyacrylamide. In one example aspect, the front layer 34 is stainless steel plated with gold, such as 14k gold, or any other purity of gold, and the back layer 36 is a polymer, polycarbonate, or carbon. The front and back layers 34, 36 may, for example, be adhered to one another with an adhesive or secured in any other manner.

In the illustrated aspect, the front layer 34 may be about 0.02" thick, and the back layer 36 may be about 0.013" thick, for an overall thickness of 0.033" for the card 10. In another aspect, the front layer 34 may be about 0.02" thick, and the back layer 36 may be about 0.007" thick, for an overall thickness of 0.027" for the card 10. In still other aspects, the overall card thickness may be in the range of 0.0315"-0.032". However, the foregoing dimensions are not limiting, as the card 10 and/or its layers 34, 36 could have any thickness.

In some aspects the front layer 34 may include a coating, such as a plating layer. The plating layer may be, for example, gold, which may be applied to a base layer of stainless steel. In certain other aspects the card 10 may include additional layers, with at least one of the layers being one or more polymeric materials. For example, outer layers of the card 10 may be polymeric while inner layers of the card 10 are carbon, or metal, or vice versa.

The vast majority of today's transaction cards are constructed of plastic. The present transaction card 10 is advantageously stronger and more durable than such plastic cards. It also may be more rigid, lighter, and/or have a longer lifespan. In addition to these benefits, the multilayer construction provides the card 10 with a unique feel and high tech look. The card 10 is thus more desirable for its distinctiveness over a typical plastic card.

Figure 4:
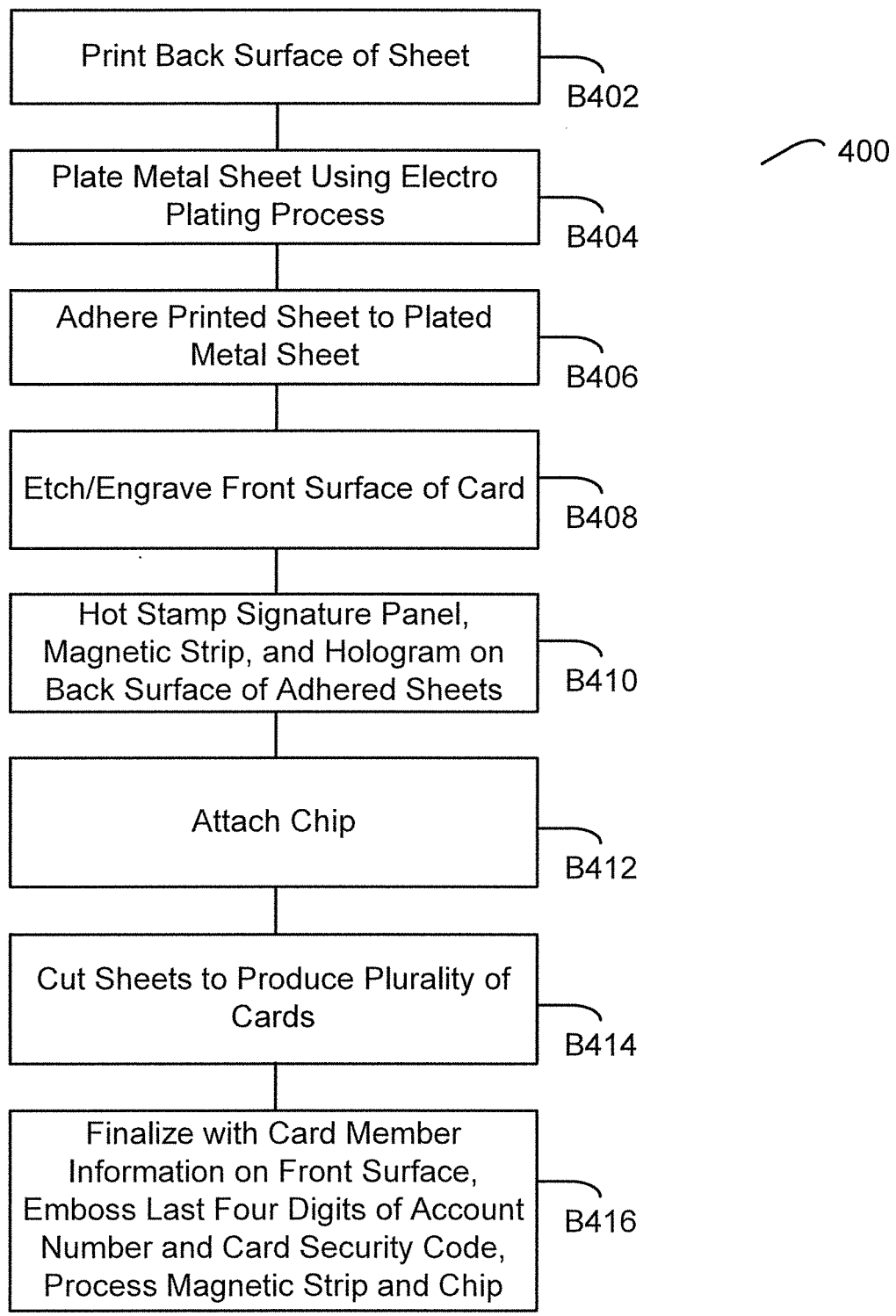
FIG. 4 is a flowchart illustrating a process for making transaction cards, according to the present aspects.

A process 400 of making the present card 10 is illustrated in FIG. 4. The process 400 comprises printing a back surface of a planar sheet with text, as shown at block B402. The sheet may be a polymer, polycarbonate, or carbon, for example. The text may include the text shown in FIG. 2, and/or an Internet address with information relating to the card 10, and/or one or more customer service phone numbers, and/or other text. The printing may be carried out on a sheet of the back layer 36 that will eventually be cut in a grid pattern to separate a plurality of cards 10 from one another.

The process further comprises plating a sheet of metal, as shown at block B404. The sheet may be stainless steel, and the plating may comprise electroplating the stainless steel sheet with gold. The plating may be carried out on a sheet of the front layer 34 that will eventually be cut in a grid pattern to separate a plurality of cards 10 from one another.

The process further comprises adhering the printed sheet to the plated metal sheet, as shown at block B406. The front surface 12 of the card 10 may then be etched to create additional text and/or an ornamental design, as shown at block B408. In alternative aspects, the additional text and/or an ornamental design may be applied with a process other than etching, such as engraving.

The process further comprises hot stamping the signature panel 28, magnetic strip 26, and hologram 32 onto the back surface of the adhered sheets, and attaching the chip 30, as shown at blocks B410 and B412, respectively. The sheets are then cut to produce a plurality of cards 10, as shown at block B414. In one aspect, the front and back sheets may measure 19.875"×25.20", and when cut each card 10 measures 3.370"×2.125". Each card 10 is then finalized with the card member information on the front surface 10, embossed with the last four digits of the account number and the card security code on the signature panel, and the magnetic strip 26 and chip 30 are processed, as shown at block B416.

The above description presents the present transaction card, and of the manner and process of making and using it, in such full, clear, concise, and exact terms as to enable any person skilled in the art to which it pertains to make and use this transaction card. This transaction card is, however, susceptible to modifications and alternate constructions from that discussed above that are fully equivalent. Consequently, this transaction card is not limited to the particular aspects disclosed. For example, the blocks of the process 400 may be reordered, or even occur simultaneously, in a number of different ways without detracting from the teachings herein. For example, combining the front layer 34 with the back layer 36 (block B406) may occur after etching or engraving the front surface of the card (block b408), after applying signature panels and the like in block B410, after attaching a chip in block B412, after cutting sheets in block B414, or the like. Additionally, certain blocks may be removed and/or combined in certain aspects. Moreover, while the discussion of the chip 30, magnetic strip 26, and hologram 32 (or other security element) focuses on attaching or stamping the elements to a surface of the card, in other aspects, some or all of these elements may be embedded within a layer or between the layers, for example. These options may make counterfeiting of the cards more difficult or even hide the fact that such an element is present in certain aspects. On the contrary, this transaction card covers all modifications and alternate constructions coming within the spirit and scope of the transaction card as generally expressed by the following claims, which particularly point out and distinctly claim the subject matter of the transaction card.

What is claimed is:

1. A transaction card, comprising:
a substantially planar sheet having a front surface, a back surface, and a continuous peripheral edge;
wherein the planar sheet includes a first layer and a second layer, wherein the first layer consists essentially of stainless steel plated with gold and the second layer comprises at least one of a polymer, polycarbonate, or carbon, wherein the first layer has a greater thickness than a thickness of the second layer.

2. The transaction card of claim 1, wherein the second layer comprises a carbon fiber-reinforced polymer.

3. The transaction card of claim 1 further comprising a radio frequency identification (RFID) chip.

4. The transaction card of claim 3 wherein the RFID chip is embedded between the first layer and the second layer.

5. A method of making a transaction card, comprising:
obtaining a first layer sheet wherein the first layer sheet consists essentially of stainless steel;
plating at least one side of the first layer sheet with gold;
obtaining a second layer sheet wherein the second layer sheet comprises at least one of a polymer, polycarbonate, or carbon;
attaching the first layer sheet to the second layer sheet to form a combined sheet;
adding at least one magnetic strip to the second layer sheet; and
cutting the combined sheet into at least one card, wherein each at least one card includes at least one magnetic strip and wherein the first layer has a greater thickness than a thickness of the second layer.

6. The method of claim 5 further comprising embedding at least one chip between the first layer sheet and the second layer sheet, wherein at least one of the plurality of cards from the cutting includes the at least one chip.

7. The method of claim 6 wherein the chip comprises an RFID chip.

8. The method of claim 5 wherein the attaching of the first layer sheet and the second layer sheet comprises using an adhesive.

9. The method of claim 5 further comprising adding card information to at least one side of the at least one card, wherein the card information includes at least one of: an account holder name, a card number, an expiration date, and a card security code.

10. The method of claim 9 wherein the card information is added by etching or engraving.

11. The method of claim 9 wherein the card information is added by embossing only the first layer sheet or the second layer sheet.

* * * * *